US009513441B2

(12) United States Patent
Huang

(10) Patent No.: US 9,513,441 B2
(45) Date of Patent: Dec. 6, 2016

(54) POLARIZING SPLITTER AND METHOD FOR MANUFACTURING SAME

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/011,846

(22) Filed: Feb. 1, 2016

(65) Prior Publication Data

US 2016/0147015 A1      May 26, 2016

Related U.S. Application Data

(62) Division of application No. 14/278,569, filed on May 15, 2014, now Pat. No. 9,297,957.

(30) Foreign Application Priority Data

May 15, 2013   (TW) .............................. 102117268 A

(51) Int. Cl.
| | | |
|---|---|---|
| G02B 6/00 | (2006.01) | |
| G02B 6/27 | (2006.01) | |
| G02B 6/126 | (2006.01) | |
| G02B 6/124 | (2006.01) | |
| G02B 6/136 | (2006.01) | |
| G02B 6/134 | (2006.01) | |
| G02B 6/42 | (2006.01) | |

(52) U.S. Cl.
CPC ............... *G02B 6/274* (2013.01); *G02B 6/124* (2013.01); *G02B 6/126* (2013.01); *G02B 6/136* (2013.01); *G02B 6/1342* (2013.01); *G02B 6/2773* (2013.01); *G02B 6/4274* (2013.01)

(58) Field of Classification Search
CPC .... G02B 6/2746; G02B 6/126; G02B 6/105; G02B 6/00; G02F 1/093; H04B 10/2569
USPC .................................. 385/11, 15, 31, 39, 45
See application file for complete search history.

(56) References Cited

U.S. PATENT DOCUMENTS 5,333,231 A  *  7/1994  Fukuda ................. G02F 1/3775
                                                          359/332
5,922,216 A  *  7/1999  Van Der Tol .......... G02B 6/125
                                                          216/17

* cited by examiner

*Primary Examiner* — Jennifer Doan
(74) *Attorney, Agent, or Firm* — Zhigang Ma

(57) ABSTRACT

A method for manufacturing a polarizing splitter includes providing a substrate including a top surface; forming a ridged asymmetric Y-shaped waveguide and a base by etching the substrate from the top surface into an inner region, the base includes an upper surface paralleling with the top surface, the ridged asymmetric Y-shaped waveguide projects from the upper surface of the base, and includes an input section configured for transmitting both a transverse electric wave and a transverse magnetic wave, a first branch configured for transmitting the transverse magnetic wave only, and a second branch configured for transmitting the transverse electric wave only, the first and the second branches branch from the input section; and forming a pair of strip-shaped first electrodes on the upper surface of the base, the strip-shaped first electrodes arranged at opposite sides of the input section and parallel with a central axis of the input section.

4 Claims, 10 Drawing Sheets

POLARIZING SPLITTER AND METHOD FOR MANUFACTURING SAME

This application is a divisional application of a commonly-assigned application entitled "POLARIZING SPLITTER AND METHOD FOR MANUFACTURING SAME", filed on May 15, 2014 with application Ser. No. 14/278,569. The disclosure of the above-identified application is incorporated herein by reference.

FIELD

The present disclosure relates to integrated optics and, more particularly, to a polarizing splitter having a relatively high polarization extinction ratio, and a method for manufacturing the polarizing splitter.

BACKGROUND

Polarizing splitters are used in integrated optics to separate transverse electric waves from transverse magnetic waves.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
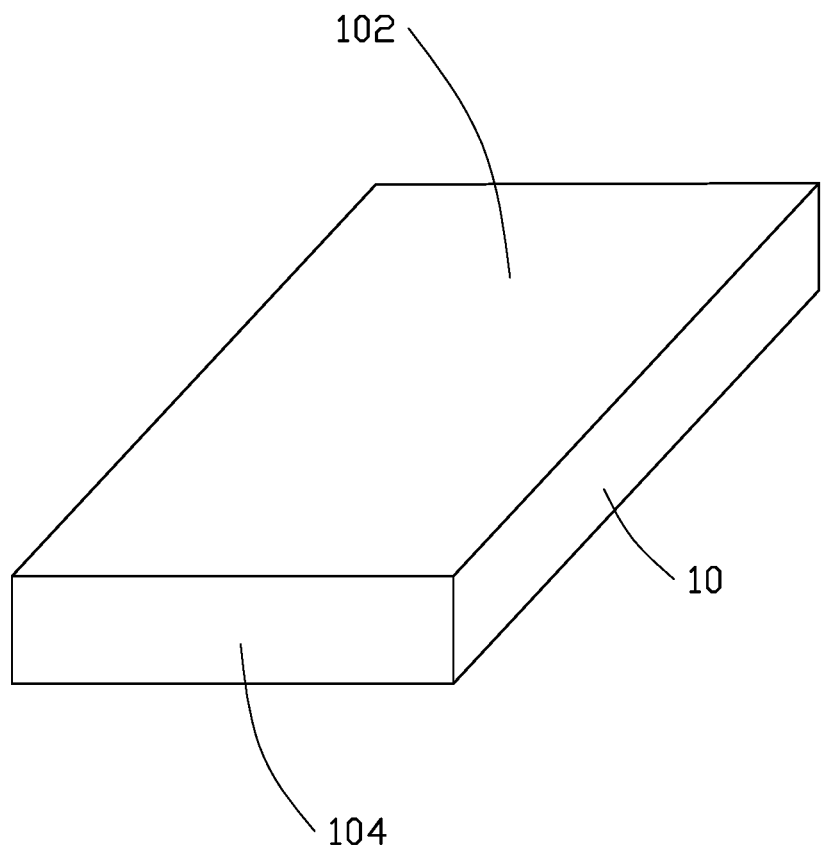
FIG. 1 is an isometric view of a substrate component, according to an embodiment.
Figure 2:
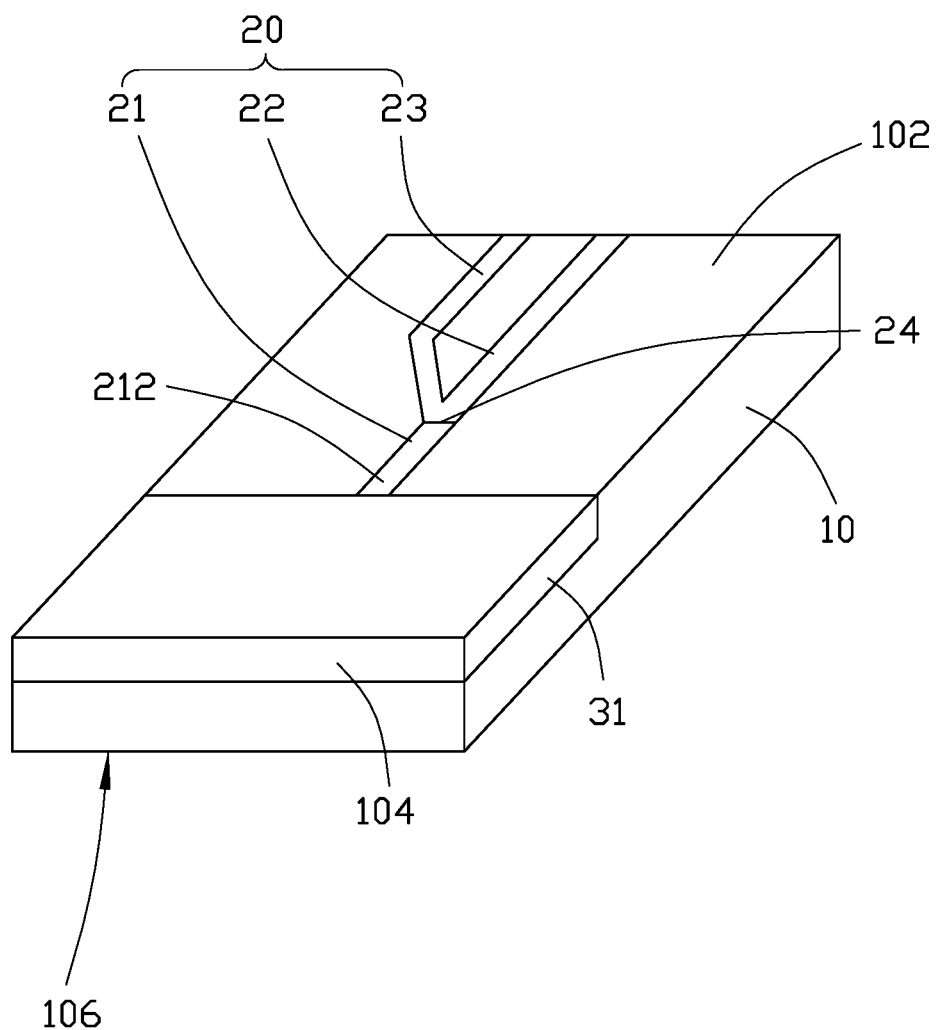
FIG. 2 shows the diffusing of a first, a second, and a third material into the substrate of FIG. 1.
Figure 3:
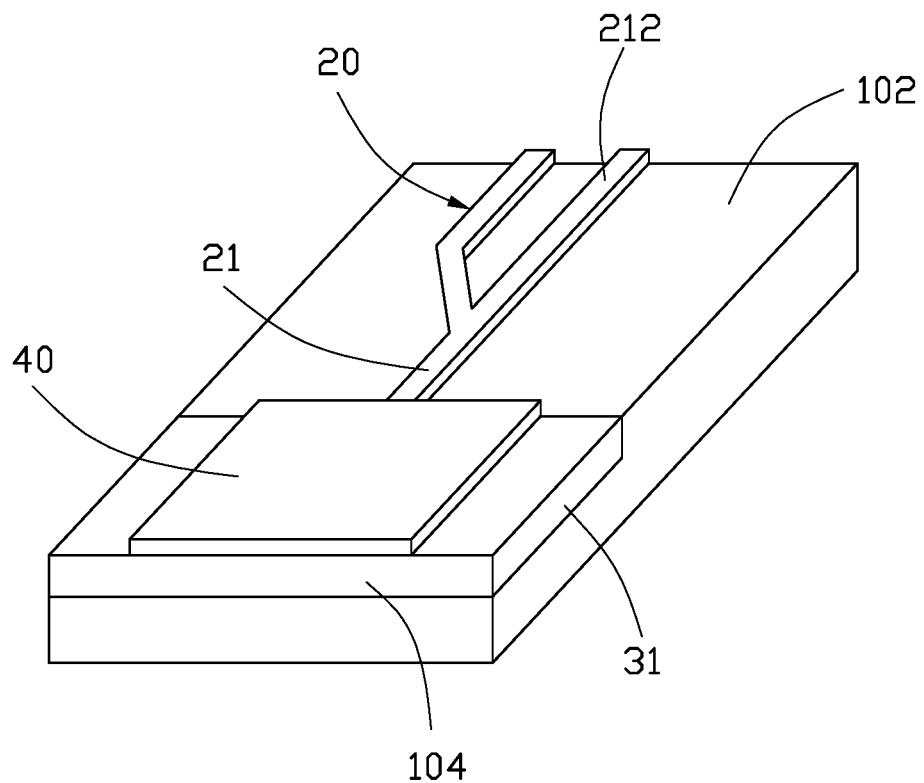
FIG. 3 shows the forming of a resist pattern layer on a surface of the substrate of FIG. 2.
Figure 4:
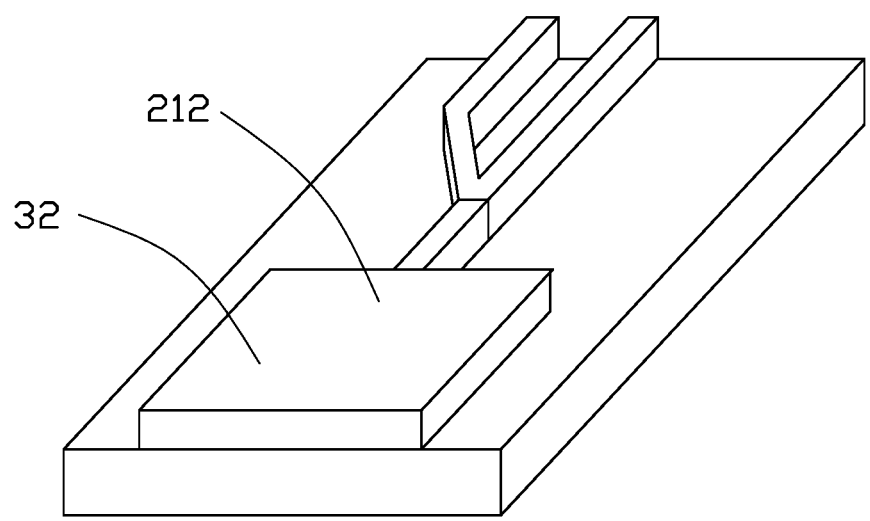
FIG. 4 shows the etching of the substrate of FIG. 3, and removing the resist pattern layer.
Figure 5:
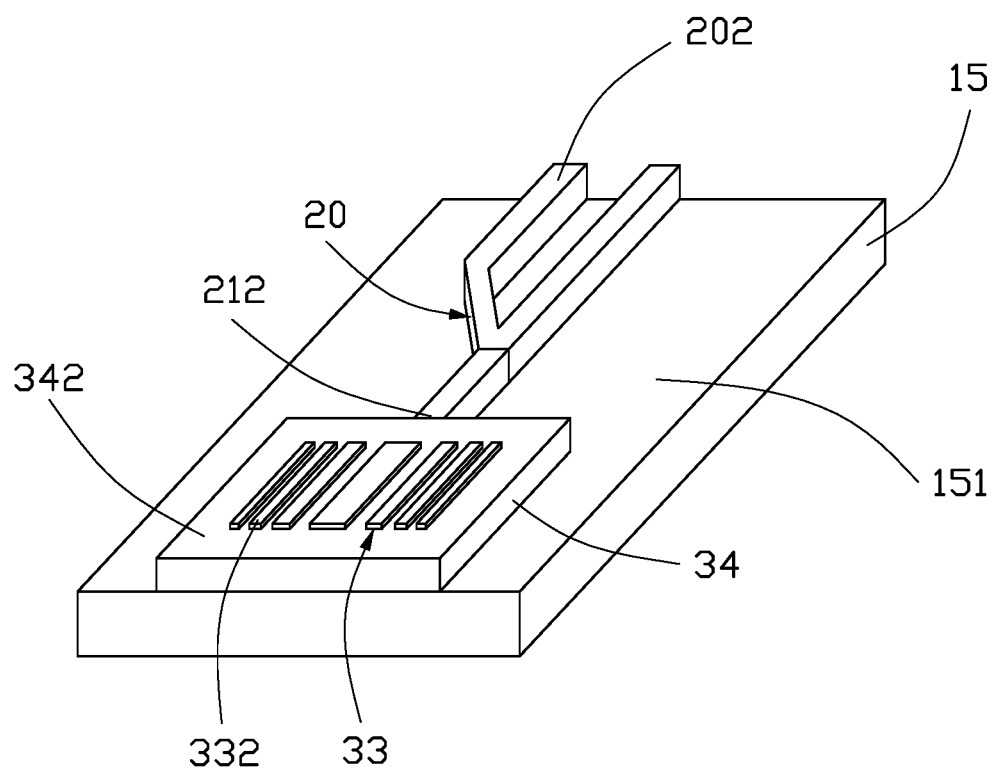
FIG. 5 shows the further etching of the substrate of FIG. 4 to obtain a media grating.

The disclosure is illustrated by way of example and not by way of limitation in the figures of the accompanying drawings in which like reference numbers indicate similar elements. It should be noted that references to "an" or "one" embodiment in this disclosure are not necessarily to the same embodiment, and such references mean "at least one." The references "a plurality of" and "a number of" mean "at least two."

FIGS. 1 to 7 illustrate a method for manufacturing a polarizing splitter 100 according to an embodiment including the following steps.

A substrate 10 is provided. The substrate 10 is made of a birefringent crystal, such as lithium niobate. The substrate 10 includes a top surface 102, a bottom surface 106 that is opposite to the top surface 102, and a side surface 104. The side surface 104 is perpendicularly connected to the top surface 102. In this embodiment, the substrate 10 is substantially rectangular and is made of lithium niobate, which can increase a bandwidth of the polarization splitter 100 as lithium niobate has a relatively higher response speed.

A first material is diffused onto the top surface 102 and into the substrate 10, therefore, a first pre-composed waveguide plate 31 and an input section 21 are obtained on the substrate 10. In this embodiment, the first material is titanium, and the first pre-composed waveguide plate 31 and the input section 21 can allow transmission of both transverse electric waves and transverse magnetic waves.

A second material is diffused onto the top surface 102 and into the substrate 10, therefore, a first branch 22 is obtained on the substrate 10. In this embodiment, the second material is gallium, and this first branch 22 can allow transmission of transverse magnetic waves.

A third material is diffused onto the top surface 102 and into the substrate 10, therefore, a second branch 23 is obtained on the substrate 10. In this embodiment, the second material is zinc-nickel alloy, and this second branch 23 can allow transmission transverse electric waves.

The input section 21, the first branch 22, and the second branch 23 cooperatively form an asymmetric Y-shaped waveguide 20. The first branch 22 and the second branch 23 branch from the input section 21. An interface 24 is formed between the input section 21 and the first branch 22 and the second branch 23. One end of the input section 21 away from the first branch 22 abuts the first pre-composed waveguide plate 31. In this embodiment, the first branch 22 and the input section 21 lie in a straight line, and the intersection with second branch 23 forms an included angle. A diffusing depth of the asymmetric Y-shaped waveguide 20 is equal to that of the first pre-composed waveguide plate 31.

A resist pattern layer 40 is provided. The resist pattern layer 40 is chromium. The top surface 102 corresponding to the asymmetric Y-shaped waveguide 20 and a portion of the pre-composed waveguide 31 is covered by the resist pattern layer 40. The portion of the pre-composed waveguide 31 covered by the resist pattern layer 40 is rectangular. Exposed portions of the pre-composed waveguide 31 are on opposite sides of the substrate 10, and the exposed portions of the pre-composed waveguide 31 are symmetrical in opposition with respect to a central axis 212 of the input section 21. The resist pattern layer 40 is formed by a plating, exposing, and developing process.

The substrate 10 together with the resist pattern layer 40 is immersed into a first etching solution, and the substrate 10 is etched from the top surface 102 exposed from the resist pattern layer 40 into an inner region, and then the asymmetric Y-shaped waveguide 20 and the portion of the first pre-composed waveguide 31 covered by the resist pattern layer 40 protrude from the substrate 10. Thus, the asymmetric Y-shaped waveguide 20 becomes a ridged asymmetric Y-shaped waveguide. The portion of the first pre-composed waveguide 31 covered by the resist pattern layer 40 forms a second pre-composed waveguide 32. A thickness of the second pre-composed waveguide 32 projecting from the substrate 10 is equal to that of the asymmetric Y-shaped waveguide 20 projecting from the substrate 10. In this embodiment, the first etching solution is hydrofluoric acid.

Then, the substrate 10 is immersed into a second etching solution to remove the resist pattern layer 40. In this embodiment, the second etching solution includes nitric acid.

A similar method is used to form a media grating 33, which is formed by etching a portion of the second pre-composed waveguide 32. The media grating 33 protrudes from the planar waveguide 34. The remaining portion of the second pre-composed waveguide 32 forms a ridged planar waveguide 34. The remaining portion of the substrate 10, except for the planar waveguide 32, the media grating 33, and the asymmetric Y-shaped waveguide 20, forms a base 15. The base 15 is configured for supporting the planar waveguide 32 and the asymmetric Y-shaped waveguide 20. The base 15 includes an upper surface 151 parallel with the top surface 102. The asymmetric Y-shaped waveguide 20 is etched so as to be thinner at the same time the second pre-composed waveguide 32 is etched. In this embodiment, the thickness of the asymmetric Y-shaped waveguide 20 projecting from the base 15 is equal to that of the planar waveguide 32 projecting from the base 15.

In this embodiment, the media grating 33 includes an odd number of media strips 332 extending along a direction substantially parallel with the central axis 212. The media strips 332 are symmetrical about the central axis 212. Each of the media strips 332 is rectangular. The thickness of each of the media strips 332 is equal. Widthwise, from a center to a side, the total width of each of the media strips 332 decreases, and the width of the gap between each two adjacent media strips 332 decreases.

Figure 6:
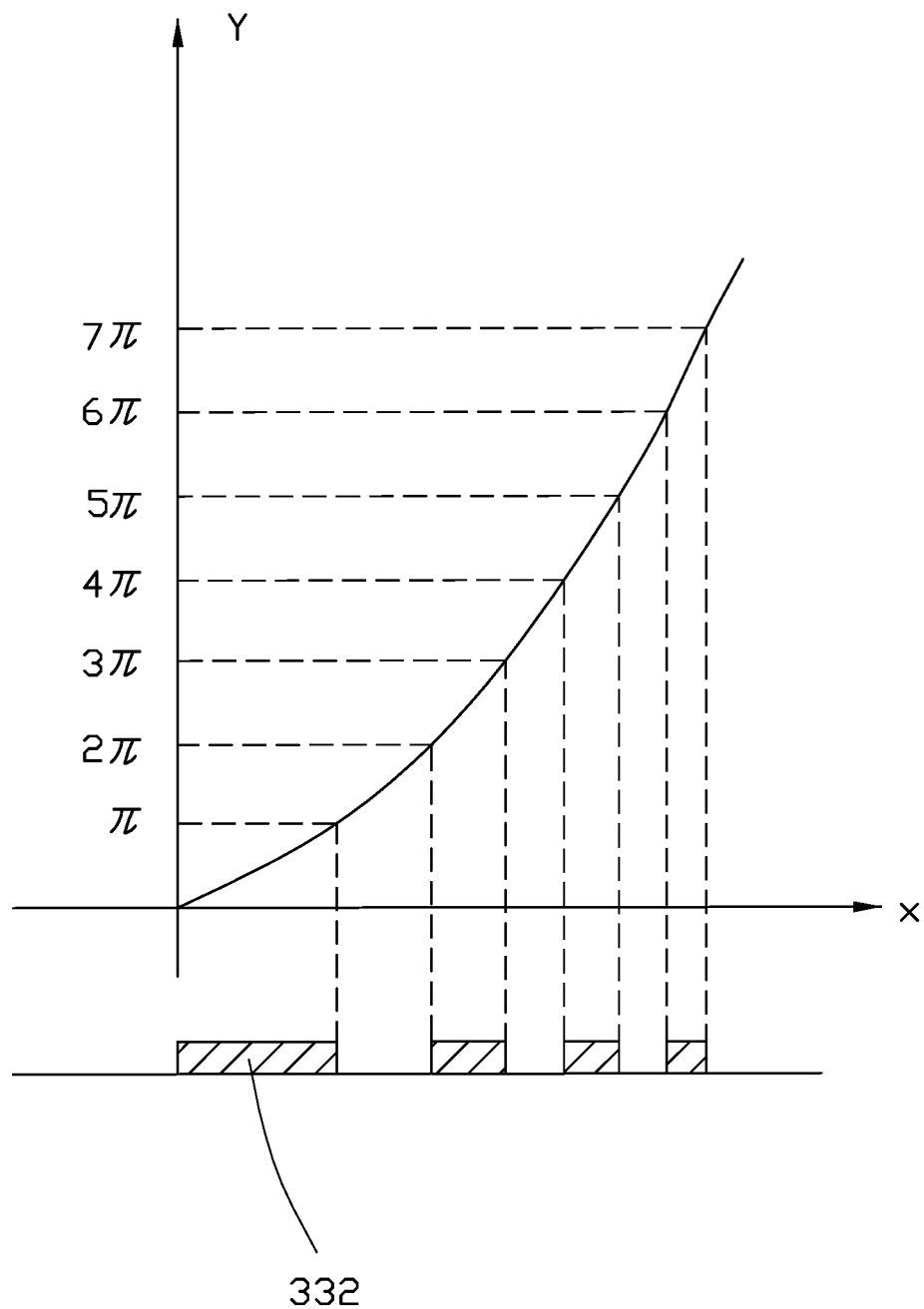
FIG. 6 is a schematic view of the media grating in FIG. 5.

FIG. 6 illustrates that a coordinate system "oxy" is established, wherein the point of origin "o" is an intersection point of the central axis 212 and a widthwise direction of the media grating 33, "x" axis is the widthwise direction of the media grating 33, and "y" axis is a phase shift of a laser beam 210 at a point "x". According to wave theory of planar waveguides, the phase shift of the laser beam 21 satisfies the formula: $y = a(1 - e^{kx^2})$, wherein x>0, a, e, and k are constants. In this embodiment, boundaries of the media strips 332 are set to conform to conditions of formulae: $y_n = a(1 - e^{kx_n^2})$ and $y_n = n\pi$, wherein $x_n$ is the nth boundary of the media strips 332 along the "x" axis, and $y_n$ is the corresponding phase shift. That is, $$x_n = \sqrt{\frac{\ln\left(1 - \frac{n\pi}{a}\right)}{k}} \quad (x_n > 0).$$

The boundaries of the media strips 332 where $x_n < 0$ are determined by the characteristics of symmetry or otherwise of the media grating 33.

Figure 7:
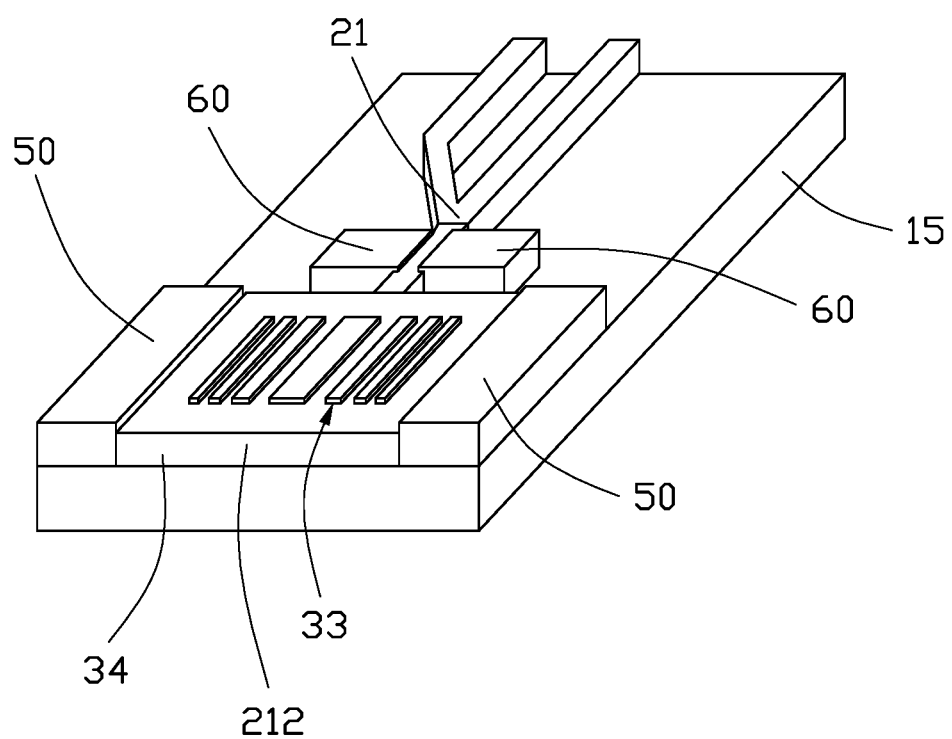
FIG. 7 shows the forming of electrodes on the media grating of FIG. 6 to obtain a polarization splitter.

FIG. 7 illustrates a pair of strip-shaped second electrodes 50 parallel with the media strips 332 and a pair of strip-shaped first electrodes 60 parallel with the input section 21. The pairs 50 and 60 are formed on the base 15 and thereby a polarizing splitter 100 is obtained.

Each strip-shaped second electrode 50 is arranged on opposite sides of the planar waveguide 34 and covers a portion of the planar waveguide 34. Each of the strip-shaped second electrodes 50 is slightly longer and slightly higher than each of the media strips 332. Each strip-shaped first electrode 60 is arranged on opposite sides of the input section 21 and covers a portion of the input section 21. Each of the strip-shaped first electrodes 60 is slightly shorter than the input section 21. The first and second electrodes 60, 50 can be formed by, for example, evaporative plating.

Figure 8:
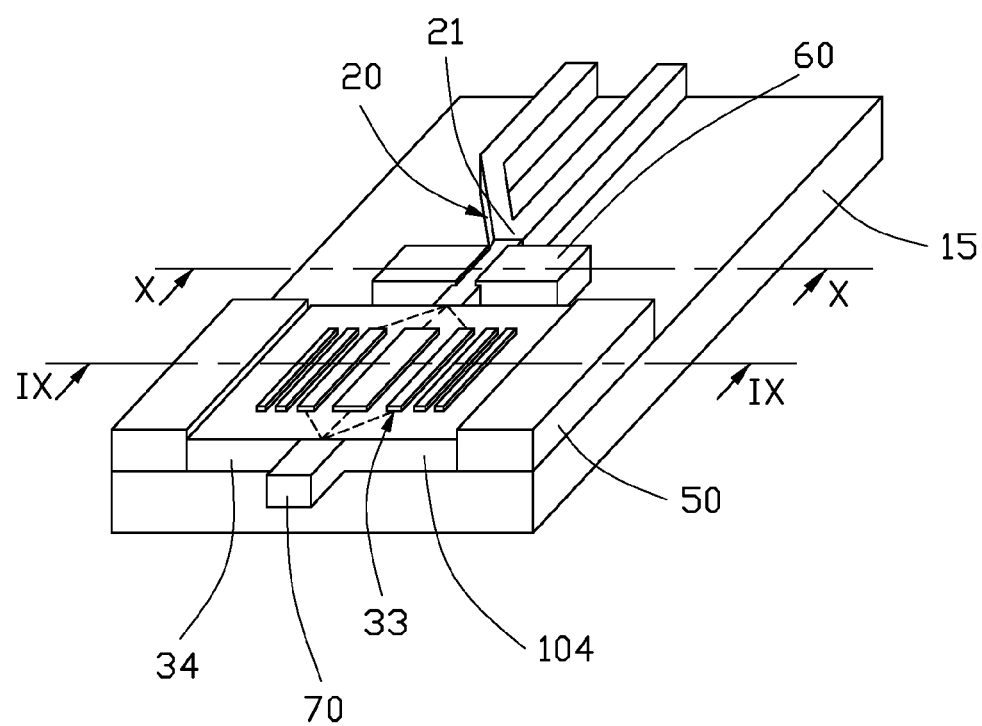
FIG. 8 shows the forming of a light source on a light incident side of the polarization splitter of FIG. 7.
Figure 9:
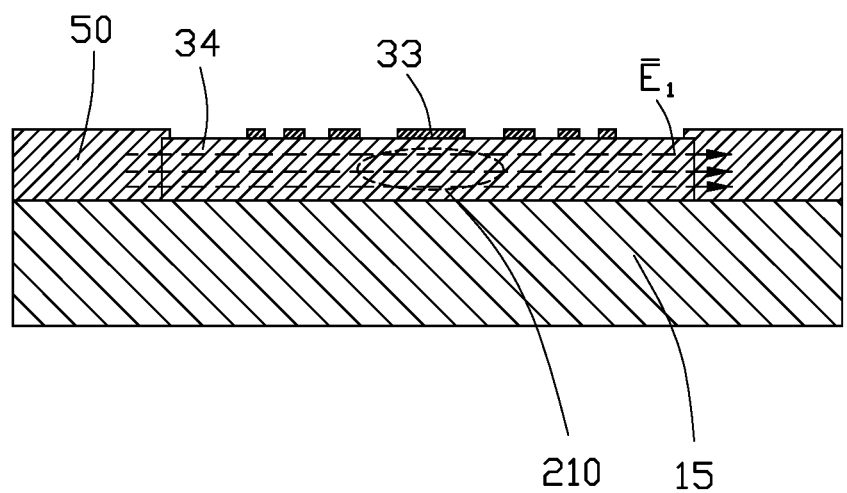
FIG. 9 is a cross-sectional view taken along line IX-IX of FIG. 8.
Figure 10:
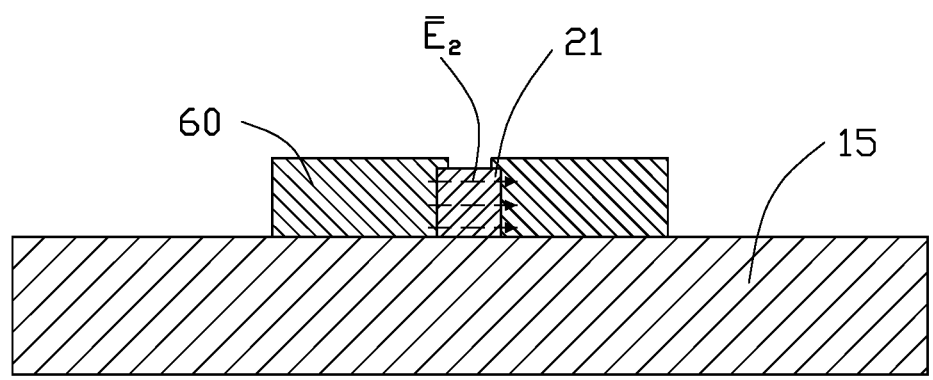
FIG. 10 is a cross-sectional view taken along line X-X of FIG. 8.

FIGS. 8-10 illustrate a laser beam 210 being emitted from a laser light source 70. The laser light source 70 is a distributed feedback laser, and is attached to a part of the side surface 104 that corresponds to the planar waveguide 34 and is aligned with the entrance of the input section 21 by, for example, a die bond technology.

The media grating 33 and the planar waveguide 34 cooperatively constitute a diffractive waveguide lens to converge the laser beam 210 into the input section 21. The strip-shaped second electrodes 50 are configured for generating electric fields to change a refractive index of the planar waveguide 34, thus changing a focal length of the diffractive waveguide lens. Thus, the strength of the laser beam 210 that enters into the input section 21 can be adjusted by adjusting the focal length of the waveguide lens to affect the convergence of the laser beam 210 at the entrance of the input section 210.

In detail, according to integrated optical theory, the media grating 33 and the planar waveguide 34 cooperatively constitute a loading waveguide, and the equivalent refractive index of a portion of the planar waveguide 34 loaded by the media grating 33 is increased. Thus, a different type of the diffractive waveguide lens can be obtained by setting a different structure of the media grating 33. In this embodiment, the refractive index of the planar wave guide 34 gradually changes by loading the media grating 33, which is advantageous for obtaining a diffractive waveguide lens with a chirped media grating.

Electric fields $\overset{\omega}{E}_1$ generated by the strip-shaped second electrodes 50 traverse the planar waveguide 34 and change an equivalent refractive index of the planar waveguide 34, and thus change a focal length of the waveguide lens. In this embodiment, the strip-shaped second electrodes 50 cover the planar waveguide 34, thus the electric fields $\overset{\omega}{E}_1$ are uniformly distributed, and that also increases the overlap area of a transverse electric wave in the planar waveguide 34 and the electric fields $\overset{\omega}{E}_1$ of the strip-shaped second electrodes 50, all of which improves the refractive ability of the diffractive waveguide lens.

Due to the birefringency effect, the transverse magnetic wave and the transverse electric wave traverse the input section 21 separately when passing through the interface 24 and respectively enter into the first branch 22 and the second branch 23. Electric field generated by the strip-shaped first electrodes 60 changes a refractive index of the input section 21 along a direction substantially perpendicular to the central axis 212 of the input section 210. As such, a phase change of the transverse electric wave is greater than a phase change of the transverse magnetic wave, which facilitates the separation of the transverse electric wave from the transverse magnetic wave and increases a polarization extinction ratio of the polarization splitter 100.

Further, due to the strip-shaped first electrodes 60 covering the input section 21, the electric fields $\overset{\omega}{E}_1$ are uniformly distributed in the input section 21, which also increases a polarization extinction ratio of the polarizing splitter 100.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A method for manufacturing a polarizing splitter, comprising:
    providing a substrate, the substrate comprising a top surface;
    forming a ridged asymmetric Y-shaped waveguide and a base by etching the substrate from the top surface into an inner region, the base being thinner than the substrate, the base comprising an upper surface parallel with the top surface, the ridged asymmetric Y-shaped waveguide projecting from the upper surface of the base and comprising an input section configured for transmitting both a transverse electric wave and a transverse magnetic wave, a first branch configured for transmitting the transverse magnetic wave only, and a second branch configured for transmitting the transverse electric wave only, the first branch and the second branch branching from the input section; and
    forming a pair of strip-shaped first electrodes on the upper surface of the base, the strip-shaped first electrodes arranged at opposite sides of the input section, covering a portion of the input section, and substantially parallel with a central axis of the input section.

2. The method of claim 1, wherein the step of forming the ridged asymmetric Y-shaped waveguide and the base comprising:
    diffusing a first material into the substrate to form the input section, diffusing a second material into the substrate to form the first branch, and diffusing a third material into the substrate to form a second branch, and the input section, the first branch, and the second branch cooperatively forming an asymmetric Y-shaped waveguide; and
    etching the substrate to protrude the asymmetric Y-shaped waveguide from the substrate, to form a ridge asymmetric Y-shaped waveguide, and a portion of the substrate, except the ridge asymmetric Y-shaped waveguide, being the base.

3. The method of claim 2, wherein the first, the second, and the third material are titanium, gallium, and zinc-nickel respectively, and the base is made of birefringent crystal.

4. The method of claim 2, further comprising:
    forming a first pre-composed waveguide plate by diffusing the first material into the substrate when forming the input section;
    etching the first pre-composed waveguide plate to froma second pre-composed waveguide plate when forming the ridge asymmetric Y-shaped waveguide;
    etching the second pre-composed waveguide plate to form a planar waveguide and a media grating, a portion of the substrate, except the ridge asymmetric Y-shaped waveguide and the planar waveguide, being the base, the planar waveguide projecting from the upper surface of the base and connecting an end of the input section opposite to the first branch, the planar waveguide being configured to receive a laser beam traversing substantially along the central axis and toward the input section, the media grating being formed on the planar waveguide and symmetrical about the central axis; and
    forming a pair of strip-shaped second electrodes on the base, the strip-shaped second electrodes being at opposite sides of the media grating, and substantially parallel with the central axis.

* * * * *